(12) United States Patent
Zhang et al.

(10) Patent No.: US 10,655,033 B2
(45) Date of Patent: May 19, 2020

(54) FLOOR COATING COMPOSITION

(71) Applicant: DOW GLOBAL TECHNOLOGIES LLC, Midland, MI (US)

(72) Inventors: Liang Zhang, Shanghai (CN); Haipeng Xu, Shanghai (CN); Zhi Gang Hua, Shanghai (CN); Wei Li, Shanghai (CN); Jingui Jiang, Shanghai (CN); Xiaohong Zhang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 207 days.

(21) Appl. No.: 15/747,629

(22) PCT Filed: Sep. 5, 2015

(86) PCT No.: PCT/CN2015/088960
§ 371 (c)(1),
(2) Date: Jan. 25, 2018

(87) PCT Pub. No.: WO2017/035832
PCT Pub. Date: Mar. 9, 2017

(65) Prior Publication Data
US 2018/0215945 A1    Aug. 2, 2018

(51) Int. Cl.
*C09D 163/10* (2006.01)
*C08G 59/56* (2006.01)
*C08G 59/50* (2006.01)
*C09D 163/00* (2006.01)
*C09D 133/04* (2006.01)
*C09D 7/40* (2018.01)
*B05D 3/00* (2006.01)
*C09D 5/00* (2006.01)

(52) U.S. Cl.
CPC ............ *C09D 163/10* (2013.01); *B05D 3/007* (2013.01); *C08G 59/50* (2013.01); *C08G 59/56* (2013.01); *C09D 5/002* (2013.01); *C09D 7/69* (2018.01); *C09D 133/04* (2013.01); *C09D 163/00* (2013.01); *C08L 2201/54* (2013.01)

(58) Field of Classification Search
CPC .............................. C09D 163/10; C08G 59/56
USPC ......................................................... 524/501
See application file for complete search history.

(56) References Cited

U.S. PATENT DOCUMENTS

2012/0301621 A1    11/2012  Dombrowski et al.
2016/0168030 A1*    6/2016  Teichert .................. C04B 26/14
                                                                428/413

FOREIGN PATENT DOCUMENTS

JP           114437 A      6/1989
WO        1993012187      6/1993
WO        2005123800     12/2005

* cited by examiner

Primary Examiner — Deve V Hall

(57) ABSTRACT

A floor coating composition that has a long pot life and dries fast, and a coating made therefrom having good slip resistance and high adhesion strength to the floor.

10 Claims, No Drawings

FLOOR COATING COMPOSITION

FIELD OF THE INVENTION

The present invention relates to a floor coating composition and a method of making the same.

INTRODUCTION

Epoxy coatings are widely used in the flooring market due to their satisfactory mechanical properties, corrosion resistance, and chemical resistance. These floor coating compositions usually comprise epoxy resin binders and hardeners. Currently, most industrial floor coatings are made using solvent borne epoxy resins that contain volatile organic solvents, such as toluene and xylene. These solvent-based systems are less environmentally friendly and less desirable than aqueous systems.

Waterborne epoxy resins have much less environmental concerns than solvent borne epoxy resins, but usually provide coating compositions with undesirably short handling time and slow hardness development. A desirable handling time (that is, working time or pot life defined as the period of time at the end of which the initial viscosity of a coating composition doubles) for floor coating compositions should be at least 2-3 hours at a processing temperature of from 20° C. to 30° C. Components in floor coating compositions need to be compatible with each other to remain a workable mixture during the handling time.

In addition, it is desirable that floor coating compositions dry as fast as possible when the coating compositions are applied to a substrate, i.e., a floor. Floor coatings also require other chemical and mechanical properties, such as slip resistance and good adhesion to the floor, to meet national and international requirements such as the GB/T 22374-2008 standard in China.

Therefore, it is desirable to provide a novel floor coating composition that dries fast at room temperature, has a long pot life, and also provides a floor coating that has the properties described above so as to meet standard requirements such as GB/T 22374-2008 standard.

SUMMARY OF THE INVENTION

The present invention relates to a floor coating composition that has a pot life of at least 6 hours at room temperature (23±2° C.). The floor coating composition of the present invention can be applied to the surface of a floor to form a coating that provides good slip resistance with a British pendulum number above 40 as measured according to the DB11/T512-2007 standard, and an adhesion strength to the floor of more than 2.0 MPa as measured according to the GB/T 22374-2008 standard. The coating also has sufficient abrasion resistance, impact resistance, water resistance, and chemical resistance to meet the standard requirements such as GB/T 22374-2008 standard. The DB11/T512-2007 standard herein is the local standard for technical specification for application of stone in decoration, which was published by Beijing Municipal Communication of Housing and Urban-Rural Development in People's Republic of China (P. R. China), issued on Dec. 12, 2007, and put into effect on Mar. 1, 2008. The GB/T 22374-2008 standard herein is the national standard for floor coatings, which was published by General Administration of Quality Supervision, Inspection and Quarantine of the P R. China and Standardization Administration of the P. R. China, issued on Sep. 18, 2008, and put into effect on May 1, 2009.

In a first aspect, the present invention is a floor coating composition, comprising:

(a) an aqueous dispersion of thermoplastic polymer particles imbibed with a thermosettable compound having at least two oxirane groups, which polymer particles are characterized by having a sufficient concentration of anti-agglomerating functional groups to stabilize the dispersion against agglomeration;

(b) a waterborne amine hardener, wherein the waterborne amine hardener comprises a polyamine adduct comprising at least one ethylene oxide segment and the waterborne amine hardener, when diluted with deionized water at 25° C. to form a diluted hardener having a calculated amine hydrogen equivalent weight of 126,250 g/eq, has a zeta potential of from −50 mV to 22 mV; and (c) a first filler present in an amount of from 60% to 90% by weight, based on the total solids weight of the floor coating composition, wherein the first filler has a sieve particle size of from 75 μm to 270 μm.

In a second aspect, the present invention is a method of preparing a floor coating. The method comprises:

(i) providing a floor coating composition of the first aspect;

(ii) applying the floor coating composition to a floor; and (iii) curing the floor coating composition to form a floor coating.

In a third aspect, the present invention is a floor coating system, comprising:

(I) a primer layer prepared from a primer composition comprising:

(a) an aqueous dispersion of thermoplastic polymer particles imbibed with a thermosettable compound having at least two oxirane groups, which polymer particles are characterized by having a sufficient concentration of anti-agglomerating functional groups to stabilize the dispersion against agglomeration; and (b) a waterborne amine hardener, wherein the waterborne amine hardener comprises a polyamine adduct comprising at least one ethylene oxide segment and the waterborne amine hardener, when diluted with deionized water at 25° C. to form a diluted hardener having a calculated amine hydrogen equivalent weight of 126,250 g/eq, has a zeta potential of from −50 mV to 22 mV; and (II) a top layer prepared from the floor coating composition of any one of claims 1-8, wherein the top layer is provided on the primer layer.

DETAILED DESCRIPTION OF THE INVENTION

The phrase "floor coating composition" of the present invention, also called "floor care composition", refers to a composition such as a floor polish composition or a floor sealer composition. The term "floor polish composition" refers to a composition for forming a film that can be stripped from the floor by a stripping agent or the like. The term "floor sealer composition" essentially refers to a composition for forming a film that is difficult to strip from a floor, but can also be used to protect flooring, such as a floor polish composition.

As used herein, a "dispersion" contains, discrete particles that are suspended in a continuous medium. When the continuous medium contains at least 50% water by weight, based on the weight of the continuous medium, the dispersion is said to be an "aqueous dispersion," and the continuous medium is said to be an "aqueous medium." When at least some of the suspended discrete particles in the dispersion contain one or more polymers, the dispersion is said herein to be a "polymer dispersion." Thus, an "aqueous polymer dispersion" contains some polymer-containing particles suspended in a continuous medium that is at least 50% water by weight.

"Pot life" refers to the period of time at the end of which the initial viscosity of a coating composition doubles. The initial viscosity is the viscosity of the coating composition measured soon after the mixing of the aqueous dispersion of thermoplastic polymer particles imbibed with a thermosettable compound and hardener components.

Unless otherwise stated, all units of temperature and pressure are room temperature (23±2° C.) and standard pressure (~1 atm or 760 mm/Hg).

The floor coating composition of the present invention comprises, component (a), an aqueous dispersion of thermoplastic polymer particles imbibed with a thermosettable compound having at least two oxirane groups (herein "imbibed latex"), which the thermoplastic polymer particles are characterized by having a sufficient concentration of anti-agglomerating functional groups to stabilize the dispersion against agglomeration.

The imbibed thermosettable compound useful in the present invention may have a multiplicity of oxirane groups. Preferably, the thermosettable compound is a di-, tri- or tetraglycidyl ether or a di-, or tri- or tetraglycidyl ester. Examples of suitable thermosettable compounds include bisphenol A diglycidyl ether; bisphenol F diglycidyl ether; 1,4-butanediol diglycidyl ether; 1,6-hexanediol diglycidyl ether; a diglycidyl ester of phthalic acid; 1,4-cyclohexanedmethanol diglycidyl ether; 1,3-cyclohexanedimethanol diglycidyl ether; a diglycidyl ester of hexahydrophthalic acid; an epoxy novolac resin; or mixtures thereof. A commercially available thermosettable compound is D.E.R.™ 331 liquid epoxy resin (The Dow Chemical Company, Midland Mich.).

The aqueous dispersion of the thermoplastic polymer particles useful in the present invention can be achieved through free radical emulsion or suspension addition polymerization or by dispersion of a preformed polymer under shear into an aqueous medium. Examples of suitable latexes include acrylic, styrene-acrylic, styrene-butadiene, urethane, ester, olefin, vinyl chloride, ethylene vinyl acetate, and polyvinyl acetate based latexes. Preferably, the thermoplastic polymer particles are acrylic polymer particles. The acrylic polymer herein refers to a polymer or copolymer comprising, as polymerized units, one or more acrylic or methacrylic monomers. "Acrylic" in the present invention includes (meth)acrylic acid, (meth)alkyl acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate. Preferably, an acrylic latex or a styrene-acrylic latex is used.

The thermoplastic polymer particles useful in the present invention are further characterized by containing anti-agglomerating functional groups, which refer to hydrophilic groups that are sufficiently unreactive with the oxirane groups (and ester groups, if present) such that the latex particles are heat-age stable at 60° C. for 10 days. The term "heat-age stable at 60° C. for 10 days" herein means that the particle size of a latex subjected to heat-aging at 60° C. for 10 days does not increase by more than 30% beyond the particle size before such heat-age treatment.

The anti-agglomerating functional groups in the thermoplastic polymer particles can be incorporated into the polymer particles using monomers containing anti-agglomerating functional groups (anti-agglomerating monomers). It is also possible to incorporate such functional groups by grafting. The anti-agglomerating functional groups are generally selected from amide groups, acetoacetoxy groups, strong protic acids which are pH adjusted to form their conjugate bases, or a combination thereof. Examples of suitable anti-agglomerating functional groups are functional groups of acrylamide; acetoacetoxyethyl methacrylate; acetoacetoxyethyl methacrylate enamine; sodium p-styrene sulfonate; 2-acrylamido-2-methylpropane sulfonic acid or a salt thereof; phosphoethyl methacrylate or a salt thereof; or combinations thereof.

Although carboxylic acid containing monomers are not anti-agglomerating, it has surprisingly been discovered that carboxylic acid groups can be incorporated into the polymer particles provided that the polymer contains sufficient levels of anti-agglomerating groups and the pH is sufficiently high to maintain latex stability under heat-age conditions.

Although not bound by theory, it is believed that anti-agglomerating groups are effective in stabilizing the polymer because the groups are both hydrophilic and non-reactive toward epoxy groups under heat-age conditions. Where the anti-agglomerating groups arise from monomers containing strong acid functionality (such as phosphoethyl methacrylate, sodium styrene sulfonate, and acrylamido-methyl-propane sulfonate), it has been discovered that colloidal and heat-age stability is achieved by adjusting the pH of the latex to a level above the first pKa of a polyprotic acid (such as phosphoethyl methacrylate) or above the pKa of a monoprotic acid (such as sodium styrene sulfonate, and acrylamido-methyl-propane sulfonate).

The concentration of anti-agglomerating functional groups in the polymer is sufficient to stabilize the thermoplastic polymer under heat-age conditions, for example, 0.5% by weight or higher or even 1% by weight or higher, and at the same time, 10% by weight or lower or even 5% by weight or lower, based on the weight of the polymer particles.

Preferably, the concentration of carboxylic acid groups can be up to 20% by weight, based on the weight of the polymer, and more preferably from 0.1% to 5% by weight.

Preferred latex is an acrylic latex containing structural units of anti-agglomerating functional groups. Monomers suitable for the preparation of acrylic latexes include acrylates and methacrylates such as methyl acrylate, ethyl acrylate, butyl acrylate, 2-ethylhexyl acrylate, methyl methacrylate, ethyl methacrylate, butyl methacrylate, and 2-ethylhexyl methacrylate, and combinations thereof. It may be advantageous to include chain transfer agents in the latex preparation. Examples of chain transfer agents include dodecylmercaptan, butylmercaptopropionate, methylmercaptopropionate, mercaptopropionic acid, or mixtures thereof.

As mentioned above, structural units of one or more acid monomers may also be included into the acrylic latex, most notably acrylic acid, methacrylic acid, and itaconic acid. Furthermore, the acrylic latexes may also include structural units of other monomers such as styrene and acrylonitrile, as well as monomers capable of imparting co-curable functionality such as glycidyl acrylates and methacrylates. It may be advantageous to incorporate into the polymer copolymerized multi-ethylenically unsaturated monomer groups. Multi-ethylenically unsaturated monomers may include, for example, allyl (meth)acrylate; diallyl phthalate; 1,4-butylene glycol di(meth)acrylate; 1,2-ethylene glycol di(meth)

acrylate; 1,6-hexanediol di(meth) acrylate; divinyl benzene; or mixtures thereof. It may be especially advantageous to incorporate such monomer groups non-uniformly into the polymer to form multiphase polymer particles to create a core-shell, hemispherical, or occluded morphology. Multiphase polymer particles such as those disclosed by Duda et al. in *Langmuir* 2005, 21, 1096-1102 may be used. The preparation of these morphologies is well known in the art. A multi-stage emulsion polymerization process usually results in the formation of at least two mutually incompatible polymer compositions, thereby resulting in the formation of at least two phases. The mutual incompatibility of two or more polymer compositions and the resultant multiphase structure of the polymer particles may be determined in a variety of ways including scanning electron microscopy using staining techniques to emphasize the difference between the phases. Multiphase polymer particles may be of various geometries including core/shell or core/sheath particles, core/shell particles with shell phases incompletely encapsulating the core, and core/shell particles with a multiplicity of cores. The final properties of these latexes are often achieved by balancing the monomer compositions of the individual phases and their relative proportions.

The imbibed latex is advantageously prepared separately from the thermosettable compound using conventional emulsion polymerization techniques, then combined with the thermosettable compound. The thermosettable compound can be neat or in the form of an aqueous dispersion, preferably as an aqueous dispersion, and more preferably as a micronized aqueous dispersion. When the thermosettable compound is added as an aqueous dispersion, the dispersion is stabilized with a stabilizing amount of a surfactant, preferably at a concentration in the range of 0.5% to 5% by weight. Nonionic surfactants are preferred, including alkyl phenol ethoxylate (APEO) free, non-ionic wetting agents such as polyalkylene oxide block copolymers, polyoxyethyleneglycol alkyl ethers, glucoside alkyl ethers, fatty acid esters, glycerol alkyl esters, sorbitan alkyl esters, and polyoxyethylene glycol alkylphenol ethers, including commercially available wetting agents such as TRITON™ X-405 octylphenol ethoxylate (The Dow Chemical Company). When the thermosettable compound is combined with the latex as a neat compound, imbibing is facilitated by agitation at or above room temperature. The weight average particle size of the imbibed latex is dependent on the application and the concentration of imbibed thermosettable resin but is typically in the range of from 150 nanometers (nm) to 350 nm. Weight average particle size is determined using light scattering.

The imbibed latex useful in the present invention has a high solids content, that is, latexes with solids content of at least 40% by weight and particularly in the range of 45-60% by weight, based on the total weight of the latex. These imbibed latexes can include high levels of the thermosettable compound, typically in the range of from 20% to 60% by weight or from 30% to 50% by weight, based on the weight of the thermoplastic particles and the thermosettable compound.

The floor coating composition of the present invention further comprises, component (b), one or more waterborne amine hardeners. The waterborne amine hardener may have a zeta potential in DI water at 25° C. of from −50 mV or higher, −45 mV or higher, −40 mV or higher, or even −35 mV or higher, and at the same time, 22 mV or lower, 20 mV or lower, 17 mV or lower, or even 12 mV or lower. Zeta potential of a waterborne amine hardener is measured by first diluting the hardener with DI water (electrical conductivity<0.2 microsiemens (μS), total dissolved solids <10 ppm) to form a composition ("a diluted hardener) having a calculated amine hydrogen equivalent weight (AHEW) to 126,250 g/eq, and measuring the zeta potential of the diluted hardener. When calculating AHEW, "amine hydrogen" refers to all active hydrogens in the amine hardener. The AHEW of the diluted hardener ($AHEW_{diluted\ hardener}$) herein is calculated based on the weight of hardener ($W_{hardener}$), the weight of DI water ($W_{DI\ water}$) used in preparing the diluted hardener and AHEW of hardener (before diluting) ($AHEW_{hardener}$), according to the equation below:

$$AHEW_{diluted\ hardener} = (W_{hardener} + W_{DI\ water}) / (W_{hardener}/AHEW_{hardener})$$

In one aspect, a mixture of the waterborne amine hardener and the aqueous dispersion of thermoplastic polymer particles imbibed with the thermosettable compound (imbibed latex) has a zeta potential of less than 10 mV, less than 5 mV, or even less than 0 mV in DI water at 25° C. Zeta potential of the mixture is measured by first diluting the hardener and the imbibed latex with DI water (electrical conductivity<0.2 μS, total dissolved solids <10 ppm) to obtain a diluted hardener having a calculated amine hydrogen equivalent weight of 126,250 g/eq and a diluted imbibed latex having a calculated epoxide equivalent weight (EEW) of 126,250 g/eq, respectively; mixing the diluted hardener and the diluted imbibed latex; and measuring the zeta potential of the obtained mixture at 25° C. The EEW of the diluted imbibed latex ($EEW_{diluted\ imbibed\ latex}$) is calculated based on the weight of imbibed latex ($W_{imbibed\ latex}$), the weight of DI water ($W_{DI\ water}$) used in preparing the diluted imbibed latex and EEW of imbibed latex before diluting ($EEW_{imbibed\ latex}$), according to the equation below:

$$EEW_{diluted\ imbibed\ latex} = (W_{imbibed\ latex} + W_{DI\ water}) / (W_{imbibed\ latex}/EEW_{imbibed\ latex})$$

The waterborne amine hardener useful in the present invention may comprise a polyamine adduct comprising at least one ethylene oxide segment. The polyamine adduct may further comprise at least one propylene oxide segment. The polyamine adduct may be the reaction product of a polyamine with an epoxy resin, such as bisphenol A diglycidyl ether, bisphenol F diglycidyl ether, or mixtures thereof. At least one of the polyamine and the epoxy resin, that is, the polyamine, the epoxy resin, or both of the polyamine and the epoxy resin, may contain at least one ethylene oxide group. The polyamine adduct can be an adduct of an ethylene oxide group containing polyamine and an epoxy resin selected from bisphenol A diglycidyl ether, bisphenol F diglycidyl ether, or mixtures thereof. The polyamine adduct can also be an adduct of a polyamine and an epoxy resin selected from an ethylene oxide group containing bisphenol A diglycidyl ether, an ethylene oxide group containing bisphenol F diglycidyl ether, or mixtures thereof. Mixtures of two or more polyamine adducts or mixtures of a polyamine adduct with one or more polyamines can be used as the waterborne amine hardener.

The polyamine adducts may be formed by simply mixing and heating the epoxy resin and a stoichiometric excess of one or more polyamine. Excess polyamine may then be removed from the adduct or a part or all may be left in the adduct.

The polyamine useful for preparing the polyamine adduct may contain from 2 to 8 primary amino groups (—$NH_2$) and from 2 to 50 carbon atoms. Examples of suitable polyamines include ethyleneamines such as diethylenetriamine, triethylenetetramine, bis(2-(piperazin-1-yl)ethylamine, aminoethylpiperazine; other polyalkylenepolyamines, cycloaliphatic diamines such as isophoronediamine, 1,3-bisaminomethyl-cyclohexane, diaminocyclohexanes, and bis(4-aminocyclohexyl)methane; alkanolamines, such as ethanolamine; polyetheramines containing at least one ethylene oxide segment; poly(oxypropylene)diamines; meta-xylene diamine; or mixtures thereof.

Suitable commercially available waterborne amine hardeners may include, for example, ANQUAMINE™ 721 waterborne modified amine hardener (Air Products and Chemicals, Allentown, Pa., USA), ARADUR™ 36 waterborne modified amine hardener (Huntsman, Salt Lake City, Utah, USA), or mixtures thereof. The amount of the waterborne amine hardener used generally varies from 1:0.75 to 1:1.5 amine equivalent to oxirane equivalent, or from 1:0.8 to 1:1.2 amine equivalent to oxirane equivalent.

The floor coating composition of the present invention further comprises one or more first fillers. The first fillers useful in the present invention have a sieve particle size of 270 µm or less, 250 µm or less, or even 212 µm or less, and at the same time, 75 µm or more, 96 µm or more, or even 120 µm or more. The sieve particle size may be measured according to the GB/T 5330-2003 standard. The first filler may be selected from silica sand, mica, or mixtures thereof. The first filler useful in the floor coating composition may be present in an amount of 60% by weight or more, 65% by weight or more, or even 70% by weight or more, and at the same time, 95% by weight or less, 92% by weight or less, or even 90% by weight or less, based on the total solids weight of the floor coating composition.

The floor coating composition of the present invention may further comprise one or more second fillers having a sieve particle size smaller than 48 µm, smaller than 25 µm, smaller than 13 µm, or even smaller than 10 µm. The second fillers may be selected from pigments such as titanium dioxide, calcium carbonate, silica flour, zinc oxide, milled glass, aluminum trihydrate, talc, antimony trioxide, fly ash, or mixtures thereof. The second filler useful in the floor coating composition may be present in an amount of from 0 to 40% by weight, from 1% to 30% by weight, or from 5% to 20% by weight, based on the total solids weight of the floor coating composition. For example, the floor coating composition may comprise the first filler in admixture with the second filler.

The floor coating composition of the present invention may further comprise one or more defoamers. "Defoamers" herein refers to chemical additives that reduce and hinder the formation of foam. Defoamers may be silicone-based defoamers, mineral oil-based defoamers, ethylene oxide/propylene oxide-based defoamers, alkyl polyacrylates, or mixtures thereof. Suitable commercially available defoamers include, for example, TEGO™ Airex 902 W and TEGO Foamex 1488 polyether siloxane copolymer emulsions (Evonik Industries, China) AG BYK™-024 silicone defoamer (BYK, China), NOPCO™ NDW and NXZ mineral oil defoamers (San Nopco, China), or mixtures thereof. The defoamer may be present, based on the total solids weight of the floor coating composition, in an amount of from 0 to 1% by weight, from 0.01% to 0.8% by weight, or from 0.1% to 0.5% by weight.

The floor coating composition of the present invention may further comprise one or more thickeners, also known as "rheology modifiers". The thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is based on HEUR. The thickener may be present, based on the total solids weight of the floor coating composition, in an amount of from 0 to 3% by weight, from 0.1% to 2% by weight, or from 0.3% to 1% by weight.

The floor coating composition of the present invention may further comprise one or more coalescents. "Coalescents" herein refer to slow-evaporating solvents that fuse polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. Preferred coalescents include dipropylene glycol n-butyl ether, ethylene glycol monobutyl ether, diethylene glycol monobutyl ether, n-butyl ether, or mixtures thereof. The coalescent may be present, based on the total solids weight of the floor coating composition, in an amount of from 0 to 10% by weight, from 0.1% to 9% by weight, or from 1% to 8% by weight.

In addition to the components described above, the floor coating composition of the present invention may further comprise any one or combination of the following additives: ultraviolet (UV) absorbers; light stabilizers; neutralizers; buffers; dispersants such as aminoalcohols and polycarboxylates; humectants; preservatives such as biocides, mildewcides, fungicides, algaecides, and combinations thereof; anti-skinning agents; colorants; flowing agents; anti-oxidants; plasticizers; leveling agents; anti-scratching agents; and grind vehicles. These additives may be present in a combined amount of from 0 to 5% by weight or from 0.01% to 2% by weight, based on the total solids weight of the floor coating composition. The floor coating composition of the present invention may have a pigment volume concentration (PVC) of 40% or more, 45% or more, or even 50% or more, and at the same time, 90% or less, 85% or less, or even 80% or less. The PVC herein is calculated according to the equation below:

$$PVC = (\text{Volume of pigments/fillers})/(\text{Volume of pigments/fillers} + \text{Volume of dry latex})$$

The floor coating composition of the present invention may be prepared with techniques known in the coating art. The process of preparing the floor coating composition may comprise admixing the aqueous dispersion of thermoplastic polymer particles imbibed with a thermosettable compound, the waterborne amine hardener, and the first filler. Other optional components described above may also be added. Components in the floor coating composition may be mixed in any order to provide the floor coating composition of the present invention. Any of the above-mentioned optional components may also be added to the composition during or prior to the mixing to form the floor coating composition.

The floor coating composition of the present invention may be prepared on-site or by mixing all components prior to the use. The floor coating composition has a long pot life, for example, at least 6 hours, at least 7 hours, at least 8 hours, or at least 10 hours, which allows end-users has sufficient handling time. The pot life of the floor coating composition is measured at room temperature and determined as the time period starting from mixing the waterborne hardener and the aqueous dispersion of thermoplastic polymer particles imbibed with a thermosettable compound to form a mixture having an initial viscosity till the time at which the viscosity of the mixture increases to double the initial viscosity. The floor coating composition of the present invention also contains low volatile organic compounds (VOC), for example, less than 100 grams of VOC per liter of the floor coating composition (g/L), less than 60 g/L, or even less than 40 g/L.

The floor coating composition of the present invention dries fast at room temperature, for example, having a touch-free time of less than 4.0 hours, less than 2.0 hours, or even less than 1.5 hours; and a dry-through time of less than 16 hours, less than 10 hours, less than 4 hours, or even less than 3 hours. Drying time may be measured at room temperature according to the GB/T 22374-2008 standard. The floor coating composition can be applied to the surface of a floor to form a coating. The coating has good slip resistance, for example, having a British pendulum number (BPN) of 40 or higher as measured by the DB11/T512-2007 method at room temperature. The coating may also have an adhesion strength to a concrete substrate of 2.0 MPa or higher as measured by the GB/T 22374-2008 standard at room temperature.

The present invention also provides a method of coating a floor, which the method comprises applying the floor coating composition to the floor. The present invention also provides a method of preparing a coating, which the method comprises: (i) mixing the imbibed latex, the waterborne amine hardener, the first filler, and optionally other components described above to form the floor coating composition; (ii) applying the floor coating composition to a floor; and (iii) curing the floor coating composition to form a coating. The time interval between the step (i) and the step (ii) can be very long while the floor coating composition is still workable (that is, a long working time), for example, from 6 hours to 24 hours, from 7 hours to 20 hours, or from 8 hours to 15 hours. The floor coating composition can be cured over a wide temperature range for a time effective to cure the thermosettable resin, for example, at a temperature of from 22° C. to 50° C. for 6 hours to 7 days or for 1 day to 3 days.

The present invention also provides a floor coating system, comprising: (I) a primer layer prepared from a primer composition; (II) a top layer prepared from the floor coating composition of the present invention, wherein the top layer is provided on the primer layer.

The primer composition useful in the present invention may comprise the aqueous dispersion of thermoplastic polymer particles imbibed with a thermosettable compound and the waterborne amine hardener described in the floor coating composition section above. The ratio of the aqueous dispersion of thermoplastic polymer particles imbibed with a thermosettable compound and the waterborne amine hardener may be the same as described above for the floor coating composition of the present invention. The primer composition can be substantially the same as the floor coating composition except that no fillers are present in the primer composition.

Examples

The present invention will now be described in the following Examples, wherein all parts and percentages are by weight unless otherwise specified. The following materials are used in the examples:

ECOGROUND™ AEH-2014 ("AEH-2014"), available from The Dow Chemical Company, is an acrylic-epoxy hybrid (AEH) dispersion having an EEW of 1,250 g/eq and is used as a binder (ECOGROUND is a trademark of The Dow Chemical Company).

ANQUAMINE™ 721, available from Air Products and Chemicals, is a waterborne modified amine hardener having an AHEW of 275 g/eq.

ARADUR™ 36, available from Huntsman, is a waterborne modified amine hardener having an AHEW of 165 g/eq.

ARADUR 39, available from Huntsman, is a waterborne modified amine hardener having an AHEW of 330 g/eq.

SUNMIDE™ WH-900, available from Air Products and Chemicals, is a waterborne modified amine hardener having an AHEW of 225 g/eq.

NATROSOL™ 250 HBR ("250 HBR"), available from Ashland, is hydroxyethylcellulose and used as a thickener.

ECOSURF™ BD-109 ("BD-109"), available from The Dow Chemical Company, is a non-ionic alcohol ethoxylate and used as a surfactant (ECOSURF is a trademark of The Dow Chemical Company).

OROTAN™ 731A, available from The Dow Chemical Company, is a sodium salt of a carboxylate polyelectrolyte and used as a dispersant (OROTAN is a trademark of The Dow Chemical Company).

BYK-333, available from BYK Additives & Instruments, is a silicone-containing surface additive and used as a leveling agent.

Ti-Pure™ R-706 ("R-706"), available from DuPont, is titanium dioxide having a median grain size of 0.36 μm and used as fillers.

Blanc Fixe N, available from Rockwood, is $BaSO_4$ having an average particle size of 1.7 μm and used as fillers.

Mica, available from Shanghai Fengchen Powdery Materials Co. Ltd., has a sieve particle size of 18 μm and is used as a filler.

Silica sand, available from Shanghai SengFei Chemical Co. Ltd., has a sieve particle size of about 109 to 212 μm.

Glycerin, available from Sinopharm Chemical Reagent Co, Ltd., is used for extending open time.

ACRYSOL™ RM-8W, available from The Dow Chemical Company, is a nonionic urethane rheology modifier (ACRYSOL is a trademark of The Dow Chemical Company).

Talc powder, available from Shanghai Fengchen Powdery Materials Co. Ltd., has a sieve particle size of about 18 μm and used as a filler.

OROTAN CA-2500 ("CA-2500"), available from The Dow Chemical Company, is a hydrophobic copolymer and used as a dispersant.

TEGO Airex 901 W, available from Evonik Industries AG is a polyether siloxane copolymer containing fumed silica and used as a defoamer and deaerator.

The following standard analytical equipment and methods are used in the Examples.

Properties of floor coating compositions and coatings made therefrom were evaluated according to the test methods listed in the below table. Floor coatings were made by mixing all components in a floor coating composition, applying the obtained floor coating composition to a substrate, and further curing the floor coating composition for 7 days at 23° C. Test methods, substrates used for the tests, and requirements for the properties are given in Table 1.

TABLE 1

| | | Substrate and Size | Test Method | Requirements |
|---|---|---|---|---|
| Drying time | Tack-free time | Concrete board (400 mm × 200 mm × 40 mm) | Item 5.2.2, page 4, GB/T 22374-2008 | ≤8 h |
| | Dry-through time | | | ≤48 h |
| Adhesion strength | | | | ≥2.0 MPa |
| Abrasion resistance (weight: 750 g, rotation speed: 500 rpm) | | Glass board (Diameter: 10 mm) | | ≤0.060 |
| Impact resistance | Grade I | Concrete board (400 mm × 200 mm × 40 mm) | | No crack |
| | Grade II | | | No crack |
| Water resistance (168 h) | | Concrete board (70 mm × 70 mm × 10 mm) | | No blister, no peeling off |
| Alkali resistance (20% NaOH, 48 h) | | Concrete board (70 mm × 70 mm × 10 mm) | | No blister, no peeling off |
| British pendulum number (BPN) | | Concrete board (400 mm × 200 mm × 40 mm) | DB11/T512-2007 | ≥40 |

Zeta Potential

The zeta potential of a waterborne hardener and mixtures of waterborne hardener/AEH dispersion, respectively, was measured with a Zetasizer NANO ZS instrument from Malvern Instruments Ltd. using an automatic modal analysis model at 25° C. Each sample was measured three times and the average value of the zeta potential was reported.

The hardener and AEH dispersion were diluted with deionized (DI) water (DI water: electrical conductivity<0.2 µS, total dissolved solids <10 ppm) to adjust the calculated amine hydrogen equivalent weight of the hardener to 126,250 g/eq and the calculated epoxide equivalent weight of the AEH dispersion to 126,250 g/eq, respectively. The obtained diluted hardener was then tested to give the zeta potential of the hardener.

To measure the zeta potential of the hardener/AEH dispersion mixture, the diluted hardener obtained above was added into the diluted AEH dispersion obtained above with stirring, equilibrated for 120 seconds, and then tested to give the zeta potential of the hardener/AEH dispersion mixture.

If the hardener/AEH dispersion mixture has a zeta potential of 10 mV or less, it represents good compatibility between the hardener and the AEH dispersion. If the hardener/AEH mixture has a zeta potential of bigger than 10 mV, it represents poor compatibility between the hardener and the AEH dispersion.

As shown in Table 2, ANQUAMINE 721 and ARADUR36 waterborne hardeners both showed good compatibility with the AEH dispersion, as indicated by more than 6 hours (h) pot life. In contrast, ARADUR 39 and SUNMIDE WH-900 waterborne hardeners both showed poor compatibility with the AEH binder and provided a pot life less than 10 minutes (min) at room temperature.

TABLE 2

| | ARADUR 39 | SUNMIDE WH-900 | ANQUAMINE 721 | ARADUR36 |
|---|---|---|---|---|
| Pot life | Less than 10 min | Less than 10 min | More than 24 h | More than 6 h |
| Compatibility with AEH (Y/N)* | N | N | Y | Y |
| Zeta potential of mixture** | 25.6 | 16.7 | 2.3 | −6.3 |
| Zeta potential of hardener | 25 | 29 | 2.5 | 20 |

*Y-good compatibility; N-poor compatibility
**Mixture refers to the mixture of hardener and AEH-2014 dispersion Examples (Exs) 1-2 and Comparative (Comp) Ex A Coating compositions of Exs 1-2 and Comp Ex A were prepared based on formulations described in Table 3, respectively. Ingredients of Component A were mixed homogenously using a stirred mixer. Then Component A obtained above was further mixed with Component B and Component C using a stirred mixer to form the coating compositions.

The VOC of the coating composition of Ex 1 was tested in National Research Center of Testing Technique for Building Materials in China according to the GB/T 22374-2008 standard. The total VOC and free formaldehyde of the coating composition of Ex 1 were only 38 g/L and 0.02 g/L, respectively, which are much lower than the requirements of GB/T 22374-2008. Benzene, toluene, xylene and heavy metals were not detected from Ex 1.

TABLE 3

| | Raw material | Comp Ex A, gram | Ex 1, gram | Ex 2, gram |
|---|---|---|---|---|
| Component A | ARADUR 36 | 78.9 | | |
| | ANQUAMINE 721 | | 131.5 | 131.5 |
| | DI water | 122.6 | 70.0 | 70.0 |
| | 250 HBR | 0.5 | 0.5 | 0.5 |
| | BD-109 | 1.5 | 1.5 | 1.5 |
| | CA-2500 | 9 | 9 | 9 |
| | TEGO Airex 901W | 3 | 3 | 3 |
| | Mica | 73.5 | 73.5 | 73.5 |
| | TiO$_2$ (R-706) | 110 | 110 | 110 |
| | BaSO$_4$ (Blanc Fixe N) | 63 | 63 | 63 |
| | DI water | 34.5 | 34.5 | 34.5 |
| | ACRYSOL RM-8W | 2.5 | 2.5 | 2.5 |
| | BYK-333 | 0.5 | 0.5 | 0.5 |
| | Glycerin | 0.5 | 0.5 | 0.5 |
| | Total | 500 | 500 | 500 |
| Component B | AEH-2014 | 500 | 500 | 500 |
| Component C | Silica sand (109-212 µm) | 300 | 1000 | 1500 |
| PVC of coating composition, % | | 38 | 61 | 69 |

Comp Ex B

Coating composition of Comp Ex B was prepared based on formulations described in Table 4. Ingredients of Component A were mixed homogenously using a stirred mixer. Component B was prepared by mixing the AEH-2014 dispersion with A-187 using a stirred mixer. Then Component A and Component B obtained above were mixed together using a stirred mixer to form the coating composition of Comp Ex B.

TABLE 4

| Raw material | | Comp Ex B, gram |
|---|---|---|
| Component A | Water | 57.55 |
| | BENTONE LT organically-modified hectorite clay additive (Elementis Specialties) | 1.77 |
| | OROTAN 731A | 8.86 |
| | ACRYSOL RM-8W | 2.73 |
| | SN-DEFOAMER 321C composed of paraffin and hydrophobic silica (Nopco Shanghai) | 3.41 |
| | Ti-Pure R 902 titanium dioxide having a median grain size of 0.405 μm, available from DuPont | 27.95 |
| | Nubirox 106, a combination of spherical and small size aggregates of minute laminar Zinc Phosphate with Zinc Molybdate (Nubirox) | 34.77 |
| | Talc | 86.59 |
| | Blanc Fixe N | 89.32 |
| | DOWANOL PM propylene glycol monomethyl ether (The Dow Chemical Company) | 3.41 |
| | DOWANOL DPnB dipropylene glycol n-butyl ether (The Dow Chemical Company) | 4.77 |
| | 15% NaNO$_2$ | 2.73 |
| | Water | 61.36 |
| | ANQUAMINE 721 | 53.18 |
| | Water | 18.41 |
| | Total | 456.82 |
| Component B | AEH-2014 | 300 |
| | SILQUEST™ A-187 Gamma-glycidoxypropyltrimethoxysilane (Momentive) | 3.42 |
| | Total | 303.42 |
| | PVC of coating composition, % | 30 |

Properties of the coating compositions and coatings made therefrom were evaluated according to the test methods described in Table 1. Results of these properties are given in Table 5. As shown in Table 5, coatings prepared from Exs 1 and 2 demonstrated better slip resistance as indicated by higher BPN, higher adhesion strength and quicker performance development as indicated by shorter drying time, as compared to coatings prepared from Comp Exs A and B. The coatings prepared from Exs 1 and 2 also demonstrated satisfactory pot life, water resistance, alkali resistance, abrasion resistance and impact resistance.

TABLE 5

| | | Comp Ex B | Comp Ex A | Ex 1 | Ex 2 |
|---|---|---|---|---|---|
| | Appearance | Homogeneous | Homogeneous | Homogeneous | Homogeneous |
| | Pot life/hour (h) | >8 h | >8 h | >8 h | >8 h |
| Drying time | Tack-free time | 2 h | 4 h | 1 h 20 min | 41 min |
| | Dry-through time | >4 h | >4 h | 2 h 9 min | 2 h |
| Adhesion strength/MPa | | 1.21 | 1.33 | 2.23 | 2.52 |
| Abrasion resistance/gram (Weight: 750 g, rotation speed: 500 rpm) | | 0.021 | 0.03 | 0.006 | 0.02 |
| Impact resistance | Grade I | No crack | No crack | No crack | No crack |
| | Grade II | No crack | No crack | No crack | No crack |
| Water resistance (168 hours) | | No blister, no peeling off | No blister, no peeling off | No blister, no peeling off | No blister, no peeling off |
| Alkali resistance (20% NaOH, 72 hours) | | No blister, no peeling off | No blister, no peeling off | No blister, no peeling off | No blister, no peeling off |
| BPN | | 21.2 | 24.8 | 47.2 | 48.8 |

What is claimed is:

1. A floor coating composition, comprising:
  (a) an aqueous dispersion of thermoplastic polymer particles imbibed with a thermosettable compound having at least two oxirane groups, which polymer particles are characterized by having a sufficient concentration of anti-agglomerating functional groups to stabilize the dispersion against agglomeration, wherein the concentration of the anti-agglomerating functional groups is from 0.5% to 10% by weight, based on the weight of the polymer particles;
  (b) a waterborne amine hardener, wherein the waterborne amine hardener comprises a polyamine adduct comprising at least one ethylene oxide segment and the waterborne amine hardener, when diluted with deionized water at 25° C. to form a diluted hardener having a calculated amine hydrogen equivalent weight of 126,250 g/eq, has a zeta potential of from −50 mV to 22 mV; and
  (c) a first filler present in an amount of from 60% to 90% by weight, based on the total solids weight of the floor coating composition, wherein the first filler has a sieve particle size of from 75 μm to 270 μm.

2. The floor coating composition of claim 1, wherein the polyamine adduct is an adduct of a polyamine and an epoxy resin selected from bisphenol A diglycidyl ether, bisphenol F diglycidyl ether, or mixtures thereof; with the proviso that at least one of the polyamine and the epoxy resin contains at least one ethylene oxide group.

3. The floor coating composition of claim 1, wherein the polyamine adduct comprises at least one ethylene oxide segment and at least one propylene oxide segment.

4. The floor coating composition of claim 1, having a pigment volume concentration of from 40% to 90%.

5. The floor coating composition of claim 1, wherein the thermoplastic polymer particles are acrylic polymer particles.

6. The floor coating composition of claim 1, wherein the thermosettable compound is selected from bisphenol A diglycidyl ether; bisphenol F diglycidyl ether; 1,4-butanediol diglycidyl ether; 1,6-hexanediol diglycidyl ether; a diglycidyl ester of phthalic acid; 1,4-cyclohexanedimethanol diglycidyl ether; 1,3-cyclohexanedimethanol diglycidyl ether; a diglycidyl ester of hexahydrophthalic acid; an epoxy novolac resin, or combination thereof.

7. The floor coating composition of claim 1, wherein the anti-agglomerating functional groups are functional groups of acrylamide; acetoacetoxyethyl methacrylate; acetoacetoxyethyl methacrylate enamine; sodium p-styrene sulfonate; 2-acrylamido-2-methylpropane sulfonic acid or a salt thereof; phosphoethyl methacrylate or a salt thereof; or a combination thereof.

8. A method of preparing a floor coating, comprising:
(i) providing a floor coating composition of claim 1,
(ii) applying the floor coating composition to a floor; and
(iii) curing the floor coating composition to form a floor coating.

9. The method of claim 8, wherein the time interval between step (i) and (ii) is from 6 hours to 24 hours.

10. A floor coating system, comprising:
(I) a primer layer prepared from a primer composition comprising:
 (a) an aqueous dispersion of thermoplastic polymer particles imbibed with a thermosettable compound having at least two oxirane groups, which polymer particles are characterized by having a sufficient concentration of anti-agglomerating functional groups to stabilize the dispersion against agglomeration, wherein the concentration of the anti-agglomerating functional groups is from 0.5% to 10% by weight, based on the weight of the polymer particles; and
 (b) a waterborne amine hardener, wherein the waterborne amine hardener comprises a polyamine adduct comprising at least one ethylene oxide segment and the waterborne amine hardener, when diluted with deionized water at 25° C. to form a diluted hardener having a calculated amine hydrogen equivalent weight of 126,250 g/eq, has a zeta potential of from −50 mV to 22 mV; and
(II) a top layer prepared from the floor coating composition of claim 1, wherein the top layer is provided on the primer layer.

* * * * *